(12) United States Patent
Griffith et al.

(10) Patent No.: US 9,026,692 B2
(45) Date of Patent: May 5, 2015

(54) DATA THROTTLING CIRCUIT AND METHOD FOR A SPACEWIRE APPLICATION

(75) Inventors: J. Steve Griffith, Colorado Springs, CO (US); John Pfeil, Colorado Springs, CO (US); Sam Stratton, Colorado Springs, CO (US)

(73) Assignee: Aeroflex Colorado Springs Inc., Colorado Springs, CO (US)

( * ) Notice: Subject to any disclaimer, the term of this patent is extended or adjusted under 35 U.S.C. 154(b) by 2015 days.

(21) Appl. No.: 11/621,503

(22) Filed: Jan. 9, 2007

(65) Prior Publication Data

US 2008/0165037 A1 Jul. 10, 2008

(51) Int. Cl.
*G06F 3/00* (2006.01)
*H03M 7/00* (2006.01)
*H04L 12/801* (2013.01)

(52) U.S. Cl.
CPC ...................................... *H04L 47/10* (2013.01)

(58) Field of Classification Search
USPC ................................................ 710/29; 341/61
See application file for complete search history.

(56) References Cited

U.S. PATENT DOCUMENTS

| | | | |
|---|---|---|---|
| 5,864,536 A | 1/1999 | Foglar | |
| 6,002,282 A * | 12/1999 | Alfke | ............................ 327/165 |
| 6,366,528 B2 | 4/2002 | Pawlowski | |
| 6,407,595 B1 * | 6/2002 | Huang et al. | .................. 327/114 |
| 2004/0158771 A1 | 8/2004 | Garnett et al. | |
| 2006/0239392 A1 | 10/2006 | Cummings et al. | |
| 2007/0064852 A1 * | 3/2007 | Jones et al. | .................... 375/356 |

OTHER PUBLICATIONS

Notification Concerning Transmittal of International Preliminary Report on Patentability, PCT/US2007/088431, dated Jul. 14, 2009, pp. 7.
"SpaceWire IP Available for Their RadHard Eclipse FPGAs and RadHard ASICs", Aeroflex Colorado Springs, News Release, Aug. 28, 2006, pp. 1-3.
"RadHard Eclipse FPGA Family with Embedded SpaceWire", Standard Products, Advanced Data Sheet, www.aeroflex.com/RadHard FPGA, Jul. 17, 2006, pp. 1-38.
"Space engineering" SpaceWire-Links, nodes, routers and networks, European Cooperation for Space Standardization, ECSS-E-50-12A, ECSS Secratariat, Noordwijk, The Netherlands, Jan. 24, 2003, pp. 1-124.

* cited by examiner

*Primary Examiner* — Kris Rhu
(74) *Attorney, Agent, or Firm* — Hogan Lovells US LLP; Peter J. Meza

(57) ABSTRACT

A Data Throttling method duplicates the full-speed transmission of data so that it appears to be transmitting at a 10 Mhz rate. Additional storage elements and multiplexers are added along the data path but this completely eliminates undesirable complexity in the clock tree. In a two-bit application, data is received and transmitted two bits at a time, and yet the output 10 Mhz data rate is maintained. For an even ratio between the system clock rate and the 10 Mhz clock signal rate, bit0 is transmitted for half the time and bit1 is transmitted for the other half of the time. But if the full-speed clock rate is an odd multiple of 10 Mhz, then there will be a "split cycle" including one bit0 and one bit1.

20 Claims, 4 Drawing Sheets

DATA THROTTLING CIRCUIT AND METHOD FOR A SPACEWIRE APPLICATION

BACKGROUND OF THE INVENTION

The present invention is related to data transmission, and, more particularly, to transmitting data at a rate slower than a system clock signal speed during link initialization in conformance with a SpaceWire application.

SpaceWire is the common name associated with the European Cooperation For Space Standardization Specification ECSS-E-50-12A. According to this specification the data rate on the wire must be slowed down to 10 Mhz during link initialization. Data Throttling is a way to meet this requirement without having to adjust the transmit clocks.

Prior auto-detect art has been developed that involves on-chip generation of a 10 Mhz clock, multiplexing with the full speed clock to create a qualified clock, and distribution of this clock on a dedicated clock network. This method proved to be unworkable when used in an FPGA implementation and when coupled with an additional requirement to drive this qualified clock off-chip. Data Throttling removes the need to create the derived clock and also the need to drive this clock off chip. The present invention therefore makes the implementation of a SpaceWire protocol handler on an FPGA more easily realizable. It can also be carried over to ASIC implementations.

An example of a prior art auto-detect circuit 100 is shown in FIG. 1. Circuit 100 includes a multiplexer 102, a D-type flip-flop 104, and a transmit buffer 106. The D-input of the D-type flip-flop receives input Transmit data. The two inputs of multiplexer 102 receives a normal Transmit clock and a slower 10 Mhz clock used during link initialization. The output of multiplexer 102 is coupled to the clock input of flip-flop 104. The output of the multiplexer provides one of the two possible clock signals in the "Txq_clk" signal depending upon the state of the multiplexer control signal ("Link_run"). Note that in FIG. 1, circuit 100 includes a multiplexer 102 in the clock path, complicating the clock tree and making FPGA implementation difficult.

What is desired is a circuit and method for providing two clock signals for Data Throttling in a SpaceWire application without the necessity of multiplexing the clock signal that is suitable for use in single or multiple bit applications.

SUMMARY OF THE INVENTION

An object of the present invention is to duplicate the full-speed transmission of data so that it appears to be transmitting at a 10 Mhz rate. For example a logic one at 100 Mhz is sent ten times to appear to be a logic one at 10 Mhz. Implementing the approach of the present invention involves adding additional storage elements and multiplexers along the data path but completely eliminates undesirable complexity in the clock tree. A slight complication is addressed by the present invention for multiple-bit applications. In a two-bit application, data is received and transmitted two bits at a time, and yet the output 10 Mhz data rate must be maintained. In a "normal" situation in which there is an even ratio between the system clock rate and the 10 Mhz clock signal rate, Bit0 is transmitted for half the time and bit1 is transmitted for the other half of the time. But if the full-speed clock rate is an odd multiple of 10 Mhz, then there will be a "split cycle" according to the present invention. For example if the full-speed clock rate is 150 Mhz, and the data to be sent is a "1-0" data pair, then, according to the present invention, there are seven transmissions of a "1-1" data pair, one transmission of a "1-0" data pair, and seven transmissions of a "0-0" data pair.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF THE INVENTION

Figure 1:
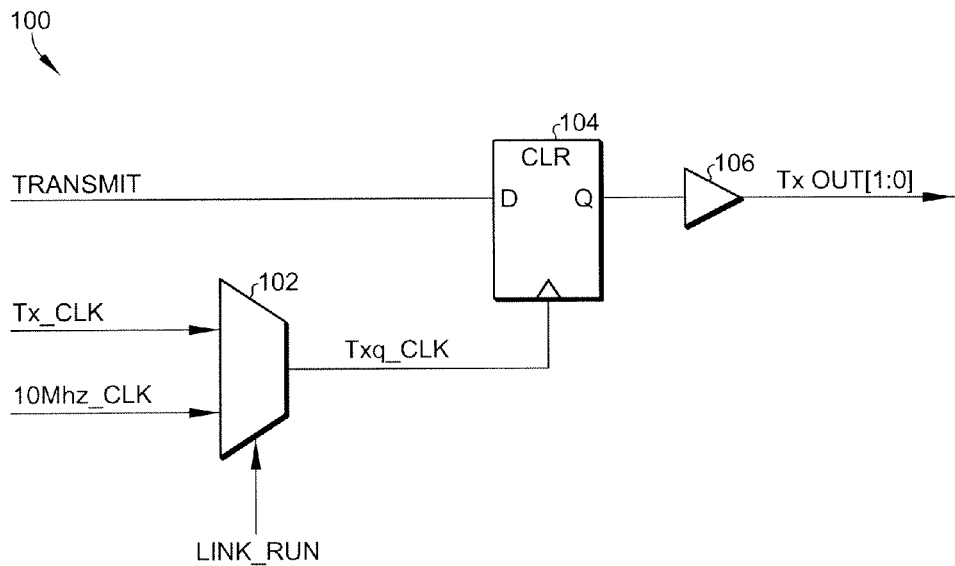
FIG. 1 is a transmit circuit for providing data at two different data rates for a SpaceWire application using a multiplexed clock signal according to the prior art.
Figure 2:
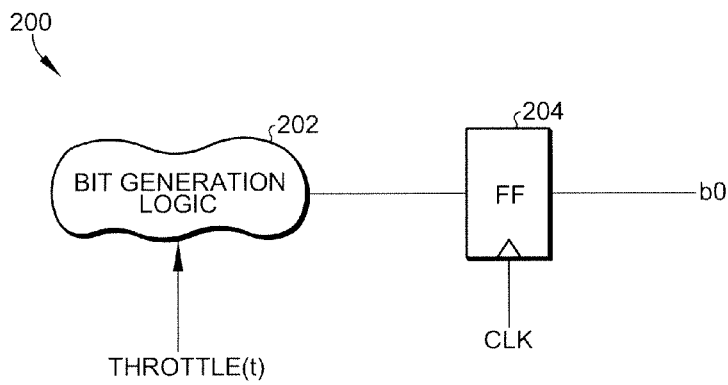
FIG. 2 is a Data Throttling circuit for a single-bit application suitable for use in a SpaceWire application according to the present invention.

Referring now to FIG. 2 a basic one-bit Data Throttling circuit 200 is shown, including bit generation logic 202 for receiving a throttle signal coupled to a flip-flop 204 for receiving a CLK signal and providing a signal bit "bit0" data output. In an "open throttle" condition in which the throttle control signal is set to a logic zero, the output data changes for every CLK cycle. In a "closed throttle" condition current data is held until the throttle control signal is released. No other logic or programming support is required for the simple one-bit data throttling shown in FIG. 1, other than the throttle control waveform and the CLK clock signal.

Figure 3:
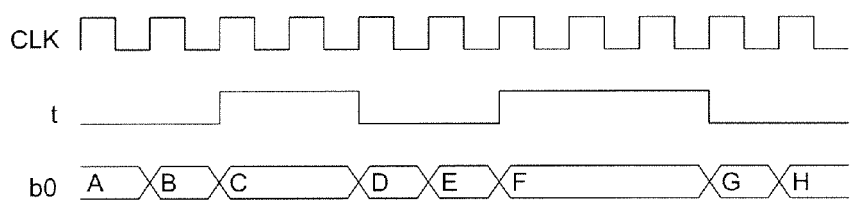
FIG. 3 is a timing diagram associated with the circuit of FIG. 2.

Referring now to FIG. 3, a timing diagram is shown for the Data Throttling circuit 200 of FIG. 2. The timing diagram includes the CLK clock signal, and a representative throttle signal "t". Note that when the throttle signal "t" is low, the output data changes state on every leading edge of the CLK signal. Alternatively, when the throttle signal "t" is high, the output data remains in the same data state and does not provide new data until the throttle signal "t" goes low.

The present invention can be extended to two-bit Data Throttling. In order to handle multiple-bit Data Throttling, the length of the throttle time must be known in terms of the system clock. For example, the throttle length or throttle rate ("TR") may be specified as two, three, four, or more clock cycles. Then, Data Throttling replicates each bit for that consecutive number of clock cycles as is explained in further detail below with reference to the timing diagram of FIG. 5.

Figure 4:
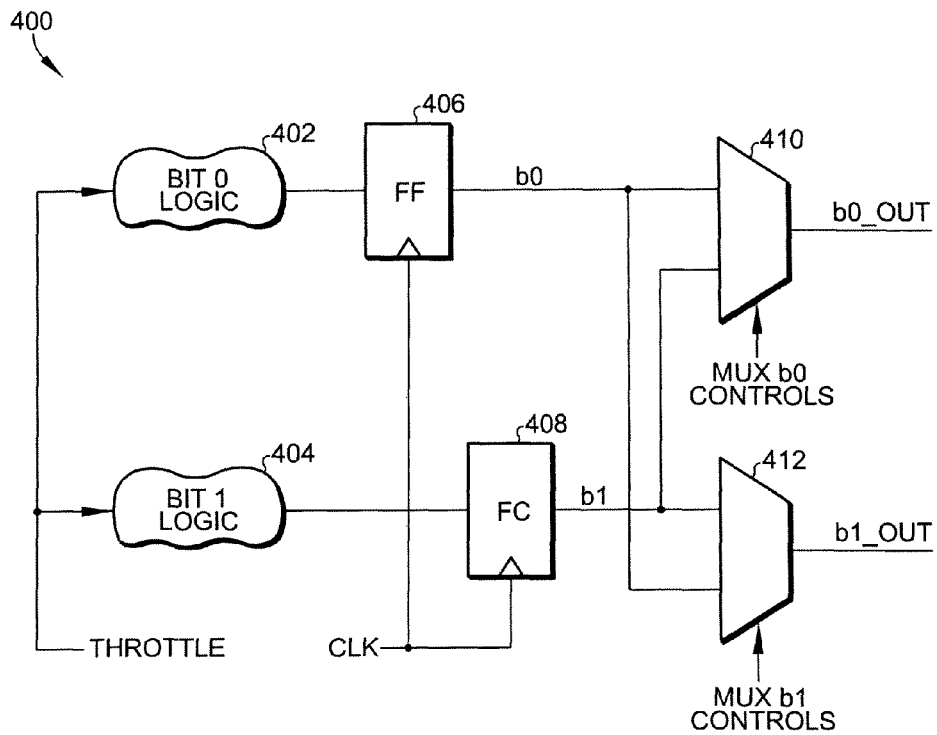
FIG. 4 is a Data Throttling circuit for a two-bit application suitable for use in a SpaceWire application according to the present invention.

Referring now to FIG. 4 a two-bit Data Throttling circuit 400 is shown, including bit0 generation logic 402 and bit1 generation logic 404. Logic blocks 402 and 404 each receive the throttle signal. The outputs of logic blocks 402 and 404 are respectively coupled to the inputs of flip-flops 406 and 408. The clock input of flip-flops 406 and 408 each receive the same CLK signal. Flip-flop 406 provides a signal bit "bit0", and flip-flop 408 provides a signal bit "bit1". A first multiplexer 410 receives the "bit0" and "bit1" signal bits, a "muxb0" control signal, and provides a "b0_out" data output signal. A second multiplexer 412 receives the "bit0" and "bit1" signal bits, a "muxb1" control signal, and provides a "b1_out" data output signal. In an "open throttle" condition in which the throttle control signal is set to a logic zero, the output data changes for every CLK cycle. New data is generated only when the throttle control signal is at a logic zero level. Additional logic circuitry is required to generate the multiplexer control signals. As in the previous one-bit application, data is held when the throttle control signal is set to a logic one level, as is explained in further detail below.

Figure 5:
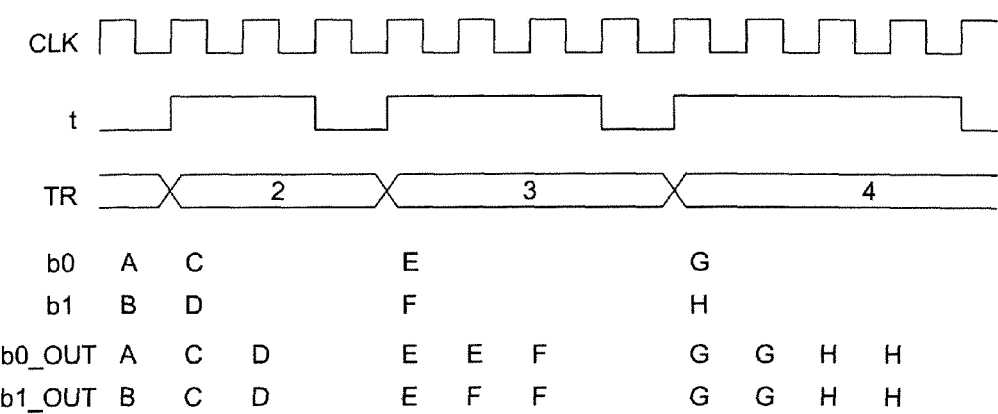
FIGS. 5 and 6 are timing diagrams associated with the circuit of FIG. 4.

Referring now to FIG. 5, a timing diagram is shown for the Data Throttling circuit 400 of FIG. 4. The timing diagram includes the CLK clock signal, a representative throttle signal "t", and the throttle rate "TR" value. For a throttle rate of two, data pair "C-D" is distributed over two clock cycles, which provides output data of two data pairs "C-C" and "D-D". For a throttle rate of three, data pair "E-F" is distributed over three clock cycles, which provides output data of three data pairs "E-E", "E-F", and "F-F". For a throttle rate of four, data pair "G-H" is distributed over four clock cycles, which provides output data of four data pairs "G-G", "G-G", "H-H", and "H-H". Note that in the timing diagram of FIG. 5, the throttle signal "t" may or may not be a 50% duty cycle signal. In the example of FIG. 5, the throttle signal "t" has a duty cycle of greater than 50%. When the throttle signal is low in the two-bit application, input data is provided directly to the output at the normal clock rate (not shown in FIG. 5).

Figure 6:
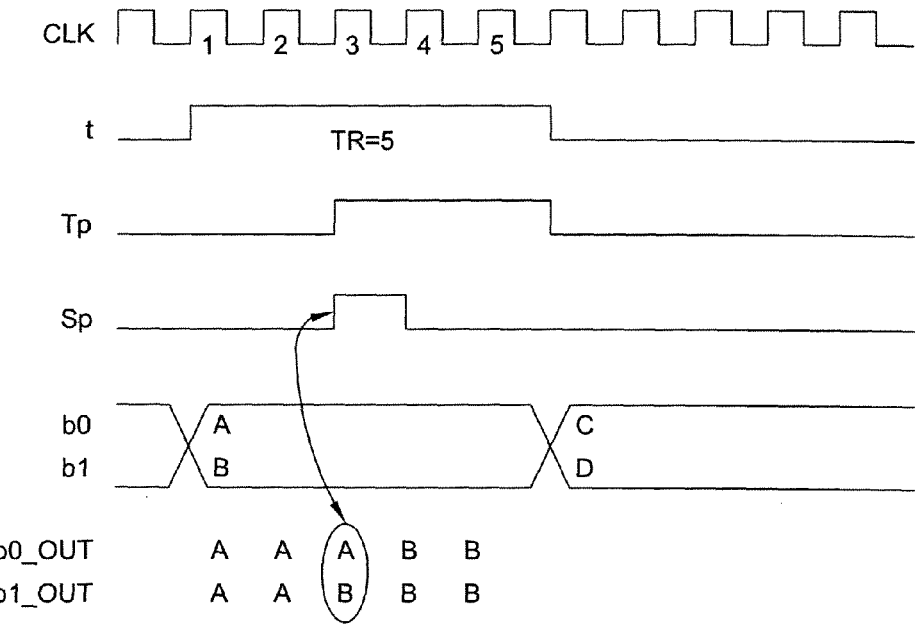

Referring now to FIG. 6, a further timing diagram is shown for the Data Throttling circuit 400 of FIG. 4. For the two-bit Data Throttling application, two additional timing signals are required to establish the multiplexer control signals. A throttle phase signal "tp" is derived from the throttle signal "t" and the "TR" register or input. The throttle phase is asserted for the last one-half of the throttle cycle. If the TR is an odd number, then the throttle phase is asserted for the last one-half of the throttle cycle plus an additional clock cycle as shown in FIG. 6. A split cycle signal "sp" is derived from the throttle phase signal and the "TR" register or input. If TR is odd, then "sp" is asserted for the first cycle of the throttle phase signal as shown in FIG. 6. The timing diagram of FIG. 6 includes the CLK clock signal, and a representative throttle signal "t" having a TR of five, the throttle phase signal, the split cycle signal, the input data, and the output data. Note in FIG. 6 that the input data pair "A-B" is distributed over five clock cycles corresponding to the TR of five, and provides output data of five data pairs "A-A", "A-A", a "split" data pair "A-B", "B-B", and "B-B".

The truth table for generating the muxb0 signal is shown below it Table One. The muxb0 signal can be easily derived from the output data state allowed to pass through the corresponding multiplexer 410 ("b0_out").

TABLE ONE

| Throttle | Throttle Phase | Split Cycle | B0 Data Out |
|---|---|---|---|
| 0 | 0 | 0 | B0 |
| 0 | 0 | 1 | B0 |
| 0 | 1 | 0 | B0 |
| 0 | 1 | 1 | B0 |
| 1 | 0 | 0 | B0 |
| 1 | 0 | 1 | B0 |
| 1 | 1 | 0 | B1 |
| 1 | 1 | 1 | B0 |

Similarly, the truth table for generating the muxb1 signal is shown below it Table Two. The muxb1 signal can be easily derived from the output data state allowed to pass through the corresponding multiplexer 412 ("b1_out").

TABLE TWO

| Throttle | Throttle Phase | Split Cycle | B1 Data Out |
|---|---|---|---|
| 0 | 0 | 0 | B1 |
| 0 | 0 | 1 | B1 |
| 0 | 1 | 0 | B1 |
| 0 | 1 | 1 | B1 |
| 1 | 0 | 0 | B0 |
| 1 | 0 | 1 | B0 |
| 1 | 1 | 0 | B1 |
| 1 | 1 | 1 | B0 |

Figure 7:
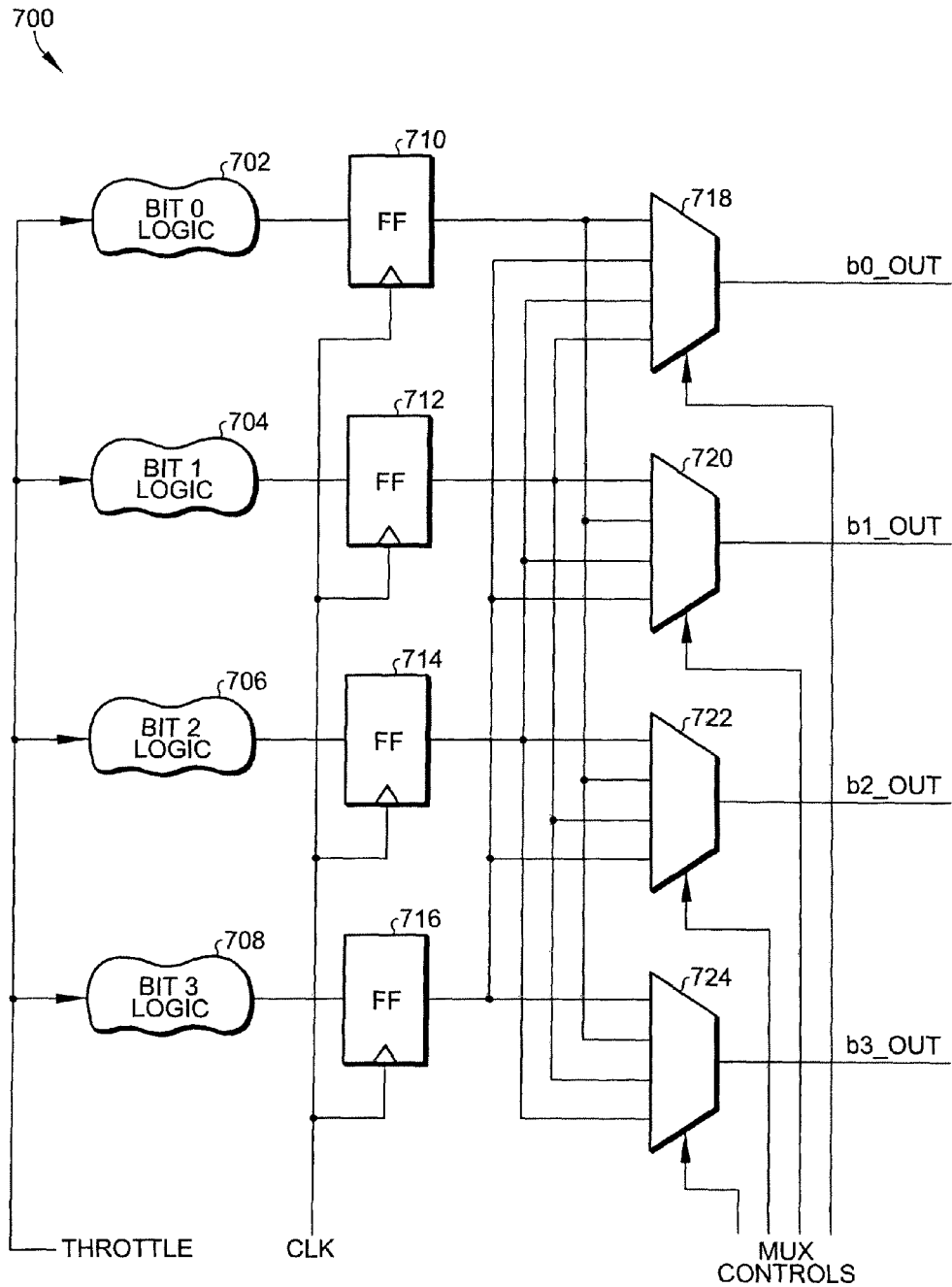
FIG. 7 is a Data Throttling circuit for a four-bit application suitable for use in a SpaceWire application according to the present invention.

If desired, the Data Throttling circuit and method of the present invention can be extended to four-bit or even higher-bit applications. Referring now to FIG. 7 a four-bit Data Throttling circuit 700 is shown, including bit0 generation logic 702, bit1 generation logic 704, bit2 generation logic 706, and bit3 generation logic 708. Logic blocks 702-708 each receive the throttle signal. The outputs of logic blocks 702-708 are respectively coupled to the inputs of flip-flops 710, 712, 714, and 716. The clock input of flip-flops 710-716 each receive the same CLK signal. Flip-flop 710 provides the signal bit "bit0", flip-flop 712 provides the signal bit "bit1", flip-flop 714 provides the signal bit "bit2", and flip-flop 716 provides the signal bit "bit3". A first multiplexer 718 receives all four signal bits, a "muxb0" control signal, and provides a "b0_out" data output signal. A second multiplexer 720 receives all four signal bits, a "muxb1" control signal, and provides a "b1_out" data output signal. A third multiplexer 722 receives all four signal bits, a "muxb2" control signal, and provides a "b2_out" data output signal. A fourth multiplexer 724 receives all four signal bits, a "muxb3" control signal, and provides a "b3_out" data output signal.

Figure 8:
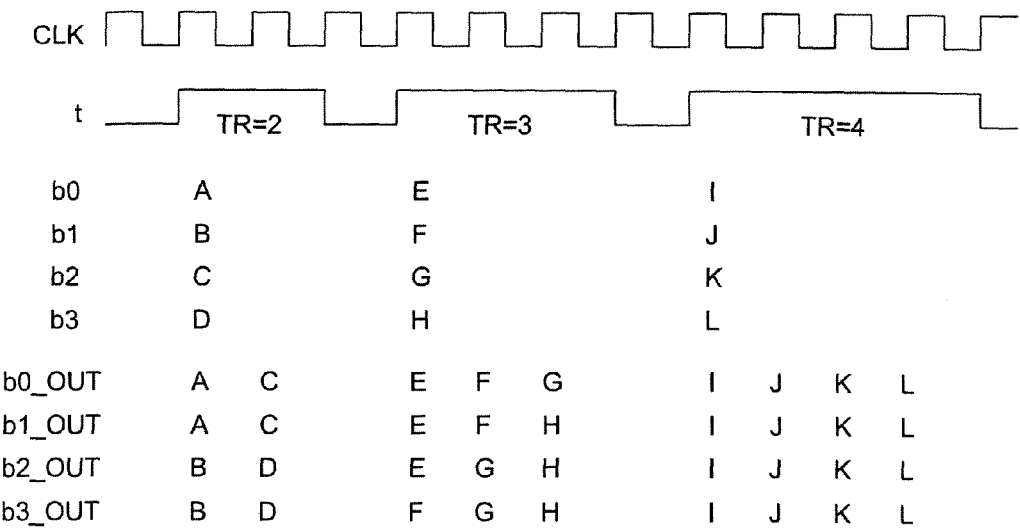
FIG. 8 is a timing diagram associated with the circuit of FIG. 7.

Referring now to FIG. 8, a timing diagram is shown for the Data Throttling circuit 700 of FIG. 7. The timing diagram includes the CLK clock signal, a representative throttle signal "t", and the throttle rate "TR" value. For a throttle rate of two, data word "A-BC-D" is distributed over two clock cycles, which provides output data of two data words "A-A-B-B" and "C-C-D-D". For a throttle rate of three, data word "E-F-G-H" is distributed over three clock cycles, which provides output data of three data words "E-E-E-F", "F-F-G-G", and "G-H-H-H". For a throttle rate of four, data word "I-J-K-L" is distributed over four clock cycles, which provides output data of four data words "I-I-I-I", "J-J-J-J", "K-K-K-K", and "L-L-L-L".

The multiplexer control signals can be derived in a manner similar to that described above with respect to the two-bit application. In particular, additional multiplexer signals are required as explained in greater detail below.

As stated previously when extending this invention to multiple bits, the throttle rate must be known along with the number of bits involved. These two values are then used to determine how many times a bit must be seen on the outputs to achieve the desired throttle effect and to create the corresponding multiplexer control signal timing. Specifically the following equation:

TO(throttle output)=$TR/\#bits$ is used for this purpose, where TR must be >=1. TR=1 is the minimum and is really the same as no throttling. In that case each throttle bit gets put out on one output for one cycle. Also note that TR can be programmed as a value in a register set.

The following examples are for two-bit throttling:

With TR=2 cycles, each bit must be seen on the outputs (TO)=TR/#bits=2/2=1. Therefore, each bit must be seen on the outputs for one full cycle.

With TR=3 cycles; TO=3/2=1.5. Therefore, each bit must be seen on the outputs for 1.5 cycles which means sending the bit on both outputs for one cycle and one of the outputs for another cycle.

The following examples are for four-bit throttling:

With TR=3 the throttle lasts for three clock cycles. Each bit must be seen on three out of the four outputs during the three cycles, i.e. 1112 2233 3444.

With TR=4 each bit must be held on all four outputs for 4/4=one full cycle.

With TR=5 each bit must be held on all four outputs for 5/4=1¼th cycle. That is all four outputs for one cycle and one output for one additional cycle.

With TR=6 each bit must be held on all four outputs for 6/4=1 2/4th cycle. That is all four outputs for one cycle and two outputs for one additional cycle.

With TR=10 each bit must be held on all four outputs for 10/4=2 2/4th cycle. That is all four outputs for two cycles and two outputs for one additional cycle.

Based on the TO equation, the multiplexer control signals are designed to select each of the bits to be multiplexed to each of the outputs for the required number of cycles. Standard logic design and minimization techniques can be applied differently to solve the specific multiplexer control implementation in several ways but in general there will be increasing number of signals required for increasing numbers of bits.

The following is a multiplexer control example for two-bit throttling:

Two signals are needed for each bit (four total) to indicate which (if any) output a bit is being sent out in the present cycle. A value of 2'b00 means that the bit is not sent out either output. A value of 2'b01 would mean it is send out on output0 only. A value of 2'b11 would mean it is sent out on both outputs. In the two bit design described above these four signals are the "B0 and B1" signals for each multiplexer. In this implementation, intermediate signals "split" and "phase" are used to help create the final B0/B1 multiplexer signals.

The following is a multiplexer control example for four-bit throttling:

Four signals are needed for each bit to be throttled (16 total). A value of 4'b1111 would mean the throttle bit is sent out all four outputs this cycle. A value of 4'b0011 would mean that the throttle bit is sent on outputs 0 and 1 only, etc. Intermediate signals such as indicate ¼, half, and ¾ of the throttle period have expired would be one possible implementation path to help create the four bit value for each throttle bit.

In extending to even higher-bit applications, the basic structure of the Data Throttling circuit remains substantially the same. The Data Throttling circuit for multiple-bit applications includes "N" logic generation circuits for receiving a data throttling signal, "N" flip-flops coupled to the logic generation circuits for receiving a clock signal, and "N" cross-coupled multiplexers each having a dedicated control signal. The output data word pattern is easily extended using the one, two, and four bit examples shown herein, and the dedicated control signals are generated by using conventional logic design and minimization techniques.

While there have been described above the principles of the present invention in conjunction with specific logic designs and methods of operation, it is to be clearly understood that the foregoing description is made only by way of example and not as a limitation to the scope of the invention. For example, the present invention can be used both for node and router applications. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

We claim:

1. A Data Throttling circuit for a SpaceWire application comprising:
   bit generation logic having an output for providing data and an input for receiving a throttle control signal; and
   a flip-flop having an input coupled to the output of the bit generation logic, a clock input for receiving a clock signal, and an output for providing output data,
   wherein the bit generation logic and the flip-flop are coupled together in an open-loop configuration, and
   wherein, in an open throttle condition output data is able to change on every clock cycle, and, in a closed throttle condition current output data is held until the closed throttle condition is released.

2. The Data Throttling circuit as in claim 1, wherein the clock signal has a rate in excess of 10 Mhz.

3. The Data Throttling circuit as in claim 1, wherein the effective data transmission rate of the output data in a closed throttle condition is 10 Mhz.

4. A Data Throttling circuit for a SpaceWire application comprising:
   a first bit generation logic circuit having an output for providing data and an input for receiving a throttle control signal;
   a second bit generation logic circuit having an output for providing data and an input for receiving the throttle control signal;
   a first flip-flop having an input coupled to the output of the first bit generation logic circuit, a clock input for receiving a clock signal, and an output for providing output data;
   a second flip-flop having an input coupled to the output of the second bit generation logic circuit, a clock input for receiving the clock signal, and an output for providing output data;
   a first multiplexer having a first input coupled to the output of the first flip-flop, a second input coupled to the output of the second flip-flop, a control node for receiving a first control signal, and an output for providing output data; and
   a second multiplexer having a first input coupled to the output of the first flip-flop, a second input coupled to the output of the second flip-flop, a control node for receiving a second control signal, and an output for providing output data,
   wherein the first bit generation logic circuit and the first flip-flop are coupled together in an open-loop configuration, the second bit generation logic circuit and the second flip-flop are coupled together in an open-loop configuration, and wherein, in an open throttle condition output data is able to change on every clock cycle, and, in a closed throttle condition current output data is held until the closed throttle condition is released.

5. The Data Throttling circuit as in claim 4, wherein the clock signal has a rate in excess of 10 Mhz.

6. The Data Throttling circuit as in claim 4, wherein the effective data transmission rate of the output data in a closed throttle condition is 10 Mhz.

7. A Data Throttling circuit for a SpaceWire application comprising:

a first bit generation logic circuit having an output for providing data and an input for receiving a throttle control signal;

a second bit generation logic circuit having an output for providing data and an input for receiving the throttle control signal;

a third bit generation logic circuit having an output for providing data and an input for receiving the throttle control signal;

a fourth bit generation logic circuit having an output for providing data and an input for receiving the throttle control signal;

a first flip-flop having an input coupled to the output of the first bit generation logic circuit, a clock input for receiving a clock signal, and an output for providing output data;

a second flip-flop having an input coupled to the output of the second bit generation logic circuit, a clock input for receiving the clock signal, and an output for providing output data;

a third flip-flop having an input coupled to the output of the third bit generation logic circuit, a clock input for receiving the clock signal, and an output for providing output data;

a fourth flip-flop having an input coupled to the output of the second bit generation logic circuit, a clock input for receiving the clock signal, and an output for providing output data;

a first multiplexer having a first input coupled to the output of the first flip-flop, a second input coupled to the output of the second flip-flop, a third input coupled to the output of the third flip-flop, a fourth input coupled to the output of the fourth flip-flop, a control node for receiving a first control signal, and an output for providing output data; and a second multiplexer having a first input coupled to the output of the first flip-flop, a second input coupled to the output of the second flip-flop, a third input coupled to the output of the third flip-flop, a fourth input coupled to the output of the fourth flip-flop, a control node for receiving a second control signal, and an output for providing output data, a third multiplexer having a first input coupled to the output of the first flip-flop, a second input coupled to the output of the second flip-flop, a third input coupled to the output of the third flip-flop, a fourth input coupled to the output of the fourth flip-flop, a control node for receiving a third control signal, and an output for providing output data; and a fourth multiplexer having a first input coupled to the output of the first flip-flop, a second input coupled to the output of the second flip-flop, a third input coupled to the output of the third flip-flop, a fourth input coupled to the output of the fourth flip-flop, a control node for receiving a fourth control signal, and an output for providing output data, wherein the first bit generation logic circuit and the first flip-flop are coupled together in an open-loop configuration, the second bit generation logic circuit and the second flip-flop are coupled together in an open-loop configuration, the third bit generation logic circuit and the third flip-flop are coupled together in an open-loop configuration, the fourth bit generation logic circuit and the fourth flip-flop are coupled together in an open-loop configuration, and wherein, in an open throttle condition output data is able to change on every clock cycle, and, in a closed throttle condition current output data is held until the closed throttle condition is released.

8. The Data Throttling circuit as in claim 7, wherein the clock signal has a rate in excess of 10 Mhz.

9. The Data Throttling circuit as in claim 7, wherein the effective data transmission rate of the output data in a closed throttle condition is 10 Mhz.

10. A Data Throttling method for a SpaceWire application comprising:

providing output data by an open-loop system; and
providing a clock signal,
wherein, in an open throttle condition output data is able to change on every clock cycle of the clock signal, and, in a closed throttle condition current output data is held until the closed throttle condition is released.

11. The Data Throttling circuit as in claim 10, wherein the clock signal has a rate in excess of 10 Mhz.

12. The Data Throttling circuit as in claim 10, wherein the effective data transmission rate of the output data in a closed throttle condition is 10 Mhz.

13. A Data Throttling method for a SpaceWire application comprising:

providing an output data pair by an open-loop system; and
providing a clock signal,
wherein, in an open throttle condition output data is able to change on every clock cycle of the clock signal, and, in a closed throttle condition current output data is held until the closed throttle condition is released.

14. The Data Throttling method as in claim 13, wherein the clock signal has a rate in excess of 10 Mhz.

15. The Data Throttling method as in claim 13, wherein the effective data transmission rate of the output data in a closed throttle condition is 10 Mhz.

16. The Data Throttling method as in claim 13, wherein, for an even throttling rate output data bit pairs are provided corresponding to either a first data input bit or a second data input bit.

17. A Data Throttling method as in claim 13, wherein, for an odd throttling rate output data bit pairs corresponding are provided corresponding to a first data input bit, a second data input bit, or a split pair including both the first data input bit and the second data input bit.

18. A Data Throttling method for a SpaceWire application comprising:

providing a four-bit output data word by an open-loop system; and
providing a clock signal,
wherein, in an open throttle condition output data is able to change on every clock cycle of the clock signal, and, in a closed throttle condition current output data is held until the closed throttle condition is released.

19. The Data Throttling method as in claim 18, wherein the clock signal has a rate in excess of 10 Mhz.

20. The Data Throttling method as in claim 18, wherein the effective data transmission rate of the output data in a closed throttle condition is 10 Mhz.

\* \* \* \* \*